US009882406B2

(12) United States Patent
Satou et al.

(10) Patent No.: US 9,882,406 B2
(45) Date of Patent: Jan. 30, 2018

(54) CHARGING CONTROL METHOD FOR LITHIUM-ION BATTERY, CHARGING CONTROL APPARATUS FOR LITHIUM-ION BATTERY AND LITHIUM-ION BATTERY SYSTEM

(71) Applicant: DENSO CORPORATION, Kariya, Aichi-pref. (JP)

(72) Inventors: Yoshinori Satou, Obu (JP); Masaki Uchiyama, Obu (JP); Nobuo Yamamoto, Toyoake (JP); Koji Ohira, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 245 days.

(21) Appl. No.: 14/828,727

(22) Filed: Aug. 18, 2015

(65) Prior Publication Data
US 2016/0072313 A1 Mar. 10, 2016

(30) Foreign Application Priority Data
Sep. 4, 2014 (JP) ................. 2014-179852

(51) Int. Cl.
*H02J 7/04* (2006.01)
*H02J 7/16* (2006.01)
*H02J 7/00* (2006.01)
*H01M 10/0525* (2010.01)
*H01M 10/46* (2006.01)
*H01M 10/44* (2006.01)

(52) U.S. Cl.
CPC .......... *H02J 7/007* (2013.01); *H01M 10/0525* (2013.01); *H01M 10/44* (2013.01); *H01M 10/46* (2013.01)

(58) Field of Classification Search
CPC ....................................................... H02J 7/007
USPC ........................................................ 320/162
See application file for complete search history.

(56) References Cited

U.S. PATENT DOCUMENTS

2012/0032647 A1* 2/2012 Watanabe ........... H01M 4/5825
320/136
2013/0314050 A1* 11/2013 Matsubara ................ H02J 7/00
320/134

FOREIGN PATENT DOCUMENTS

JP  2009-093924  4/2009

* cited by examiner

*Primary Examiner* — Edward Tso
*Assistant Examiner* — Ahmed Omar
(74) *Attorney, Agent, or Firm* — Harness, Dickey & Pierce, P.L.C.

(57) ABSTRACT

A lithium-ion battery includes a cathode active material of the Olivine-type crystal structure. The lithium-ion battery is charged under control of a charging control apparatus, which performs a charging process for charging up to a target voltage according to a constant-current and constant-voltage charging method, a negative-electrode potential evaluation process for evaluating a potential change quantity at the negative-electrode, and a voltage setting process for setting the target voltage to a lower voltage based on the potential change quantity of the negative-electrode evaluated by the negative-electrode potential evaluation process. The charging voltage is changed from the target voltage to the set voltage even when the negative-electrode potential changes with an increase in the number of charging and aging deterioration. Thus a positive-electrode potential is suppressed from rising because of less susceptibility to the increase in number of charging and aging deterioration.

7 Claims, 4 Drawing Sheets

CHARGING CONTROL METHOD FOR LITHIUM-ION BATTERY, CHARGING CONTROL APPARATUS FOR LITHIUM-ION BATTERY AND LITHIUM-ION BATTERY SYSTEM

CROSS REFERENCE TO RELATED APPLICATION

This application is based on and incorporates herein by reference Japanese patent application No. 2014-179852 filed on Sep. 4, 2014, the content of which is incorporated herein by reference.

FIELD

The present disclosure relates to a method and apparatus for controlling charging of a lithium-ion battery, which has an anode and a cathode, and a lithium-ion battery system.

BACKGROUND

A conventional technology regarding a lithium-ion secondary battery proposes to improve clone efficiency, cycle characteristic and chargeable capacity through speedily raising a positive-electrode potential at a final stage of charging (for example, JP 2009-093924A). This lithium-ion secondary battery is charged through a constant-current and constant-voltage method or a multi-step constant-current method so that the positive-electrode potential speedily rises at the final stage of charging.

According to the constant-current and constant-voltage charging method or the multi-step constant-current charging method, the positive-electrode potential relative to a negative-electrode potential (for example, potential relative to a carbon negative electrode) rises with charging and discharging as well as aging deterioration. Further, when the positive-electrode potential rises quickly at the final stage of charging, electrolyte solution generates decomposition gas. In a case that a positive-electrode material (cathode active material and the like having an Olivine-type crystal structure), a resistance of which increases at the final stage of charging, the rising of the positive-electrode charge potential of the lithium metal reference causes an excessive voltage rapidly at the end of charging made at a constant C rate and also other problems such as deposition of lithium. Further it is likely to become a factor to promote more gas generation.

SUMMARY

It is therefore an object to provide a charging control method for a lithium-ion battery, a charging control apparatus for a lithium-ion battery and a lithium-ion battery system, which suppress a positive-electrode potential (positive-electrode potential of a lithium metal reference) from rising at a final stage of charging and solve various problems, which promote deterioration, in a battery using a cathode active material having an Olivine-type crystal structure.

According to one aspect, a charging control method and apparatus for controlling charging of a lithium-ion battery, which is provided with a positive electrode and a negative electrode, are configured to perform charging processing, negative-electrode potential evaluation processing and voltage setting processing. The charging processing charges the lithium-ion battery to a target voltage by a constant: current and constant-voltage charging method. The lithium-ion battery includes a cathode active material having Olivine-type crystal structure. The negative-electrode potential evaluation processing evaluates a potential change quantity of the negative electrode. The voltage setting processing sets the target voltage to decrease based on the potential change quantity of the negative-electrode evaluated by the negative-electrode potential evaluation processing.

EMBODIMENT

Each figure illustrates structural parts, which are essential for description and does not always illustrate all actual structural parts. References to directions such as "top, bottom, left, right" are based on the illustrations in the drawings. In the description, a potential of a positive electrode is referred to as a "positive-electrode potential" and a potential of a negative electrode is referred to as a "negative-electrode potential." A "voltage," when it is simply referred to, means a potential difference between a positive-electrode potential and a negative-electrode potential.

Figure 1:
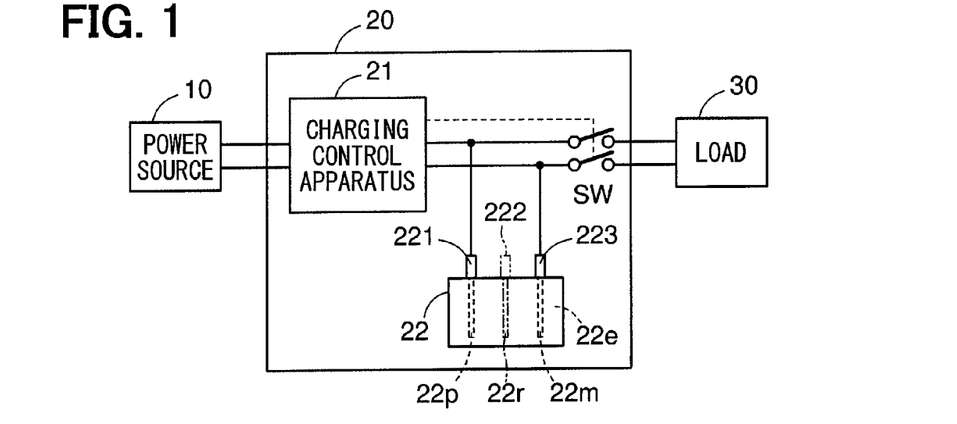
FIG. 1 is a schematic diagram showing a first exemplary configuration of a lithium-ion battery system.

A lithium-ion battery system 20 shown in FIG. 1 is mounted in a vehicle (primarily automotive car) and includes a charging control apparatus 21, a lithium-ion battery 22 and the like. This system is referred to simply as a "battery pack" occasionally. The charging control apparatus 21 controls charging of the lithium-ion battery 22. Switches SW shown in the figure are provided when necessary and controlled to turn on and off by the charging control apparatus 21 as shown by dotted lines.

With the switches SW being turned off, the charging control apparatus 21 receives electric power from an electric power source 10 and charges the lithium-ion battery 22. This charging is performed according to a constant-current and constant-voltage charging method shown in FIG. 4. With the switches SW being turned on, the charging control apparatus 21 supplies (that is, discharges) power from the lithium-ion battery 22 to an electric load 30. An exemplary configuration of the charging control apparatus 21 will be described later with reference to FIG. 2. The charging control apparatus 21 is a protection circuit, which monitors charging and discharging of the lithium-ion battery 22.

The power source 10 may be any types as far as it can supply electric power required for charging. For example, it may be a rotary electric machine having a power-generation function, a generator, a solar battery, other batteries (not limited to lithium-ion battery), a commercial power, or the like. The load 30 may be any types as far as it operates with electric power supplied thereto (for example, devices, apparatuses, parts or the like mounted in a vehicle). The power source 10 and the load 30 are normally different types but may be the same types.

The lithium-ion battery 22 is a secondary battery, which has a cathode active material of Olivine-type crystal structure (Olivine system), and includes at least a positive electrode 22p, a negative electrode 22m and an electrolyte solution 22e. A reference electrode 22r and a reference terminal 222, which will be described later, shown by dotted lines may be provided as the case may be. Although not shown, an insulating separator is interposed between the positive electrode 22p and the negative electrode 22m.

Each of the positive electrode 22p and the negative electrode 22m includes an electric collector, an electrode layer and the like. The electric collector may be formed of any conductive material without being limited to metallic elements and alloys and formed in any shape. The electric collector may include metallic foils or be metallic elements or alloys of low electric resistivity. The electrode layer is an active material layer and provided on the electric collector as a layer of materials, which correspond to the positive electrode 22p and the negative electrode 22m. The electrolyte solution 22e (electrolyte) may be any type as far as it can transfer charge carrier (for example, ions) between the positive electrode 22p and the negative electrode 22m.

According to the present embodiment, each electrode is formed and connected as follows. As far as the positive electrode 22p is formed to contain a cathode active material of Olivine-type crystal structure, materials to be used as a conductor, a binder, a solvent and the like are not limited. The cathode active material of Olivine-type crystal structure is one type of composite oxides of lithium and transition metal. For example, it may be lithium-iron phosphate (LiFePO4), lithium magnesium phosphate (LiMnPO4), lithium magnesium iron phosphate (LiFexMn1-xPO4; 0≤x<1), nickel phosphate (LiNiPO4) or the like.

As far as the negative electrode 22m is formed to contain an anode active material to be used as a conductor, a binder, a solvent and the like are not limited. The negative-electrode material may be a graphite group (carbon group) material or a material, which includes at least one element among Sn, Si, Sb, Ge and C. The reference electrode 22r is a reference electrode formed of metallic lithium. The positive electrode 22p is connected to a positive terminal 221. The negative electrode 22m is connected to a negative terminal 223. The reference electrode 22r is connected to the reference terminal 222. The separator, non-aqueous electrolyte and the like may use any materials as far as they function as the lithium-ion battery 22. That is, it is suffice that the lithium-ion battery 22 is configured to exhibit the charging characteristics shown in FIG. 5 to FIG. 8 described later.

Figure 2:
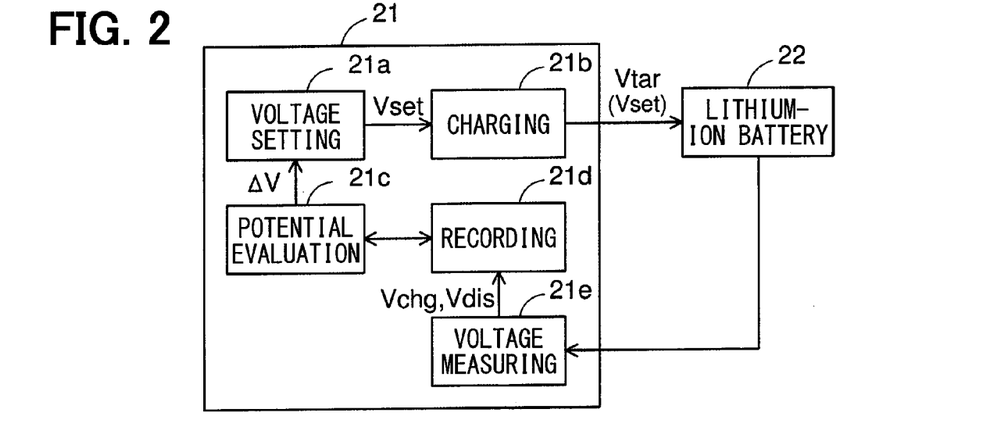
FIG. 2 is a schematic diagram showing an exemplary configuration of a charging control apparatus.

The charging control apparatus 21 shown in FIG. 2 is configured to include a voltage setting part 21a, a charging part 21b, a negative-electrode potential evaluation part 21c, a recoding part 21d, a voltage measuring part 21e and the like.

The discharging part 21b is configured to control charging and discharging of the lithium-ion battery 22. The discharging part 21b charges the lithium-ion battery 22 up to a target voltage Vtar at the first charging, that is, before the negative-electrode potential evaluation part 21c evaluates a negative-electrode potential. The target voltage Vtar is recorded in an arbitrary form. For example, the target voltage Vtar may be recorded in the recording part 21d or the target voltage Vtar may be included in a program. The discharging part 21b is configured to charge the lithium-ion battery 22 up to a set voltage Vset, which is set by the voltage setting part 21a in the second and subsequent charging, that is, after the negative-electrode potential evaluation part 21c evaluated the negative-electrode potential. Although the target voltage Vtar and the set voltage Vset are different, these voltages are similar as voltages for charging the lithium-ion battery 22.

The voltage measuring part 21e is configured to measure a voltage of the lithium-ion battery 22, which varies with charging and discharging from time to time, and records it in the recording part 21d. A voltage sensor is provided for measuring the voltage. Since the voltage of the lithium-ion battery 22 is a potential difference between the positive-electrode potential and the negative-electrode potential, the voltage sensor may be located at an arbitrary point, for example, inside the charging control apparatus 21 or outside the charging control apparatus 21. The voltage may be measured and recorded in the recording part 21d at an arbitrary timing as far as a potential change quantity $\Delta V$ of the negative electrode 22m can be evaluated. In the following description, the voltage measured at charging time is referred to as a charging voltage Vchg and the voltage measured at discharging time is referred to as a discharging voltage Vdis.

The recording part 21d may be an arbitrary record medium as far as it can record the charging voltage Vchg, the discharging voltage Vdis and other processing data. It is preferred to use a non-volatile memory, which is capable of keep storing the record contents even after a shut-off of power supply. A collection of predetermined data is referred to as a profile. For example, a collection of charging voltages Vchg form one profile (charging voltage profile) and a collection of discharging voltages Vdis form another profile (discharging voltage profile).

The negative-electrode potential evaluation part 21c is configured to evaluate the potential change quantity $\Delta V$ of the negative electrode 22m based on data such as the charging voltage Vchg and the discharging voltage Vdis. The potential change quantity $\Delta V$ will be described with reference to FIG. 3.

Figure 3:
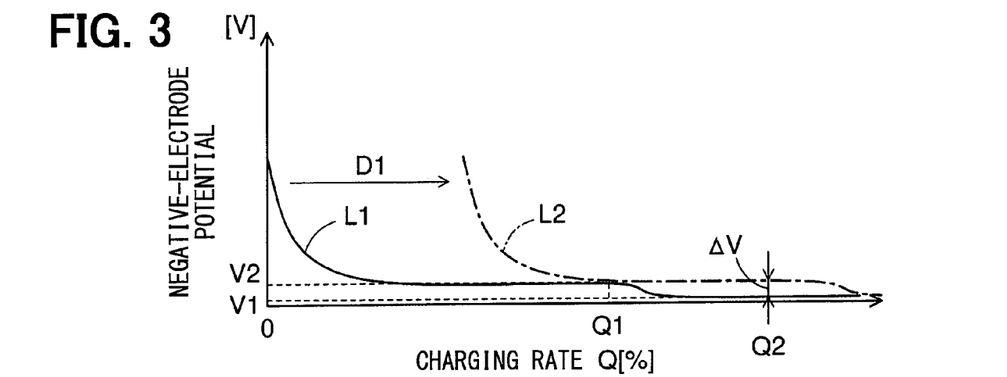
FIG. 3 is a graph showing exemplary changes of a negative-electrode potential (negative-electrode voltage)

FIG. 3 shows exemplary changes of the negative-electrode potential at the charging time in a graph, in which an axis of ordinate indicates a negative-electrode potential [V] and an axis of abscissa indicates a charging rate Q [%]. A potential change at the first charging time is indicated with a charging curve L1 (solid line) and a potential change at the n-th charging time ("n" is an integer equal to or larger than 2) is indicated with a charging curve L2 (one-dot chain line). The charging curves L1 and L2 both correspond to characteristic curves. The negative-electrode potential is a potential difference between the negative electrode 22m and the reference electrode 22r, which can be measured by connecting the voltage sensor between the negative terminal 223 and the reference terminal 222. This negative-electrode potential gradually changes its characteristic in accordance with an increase in the number of charging times and aging deterioration.

The charging curve L1 indicates that the negative-electrode potential starts to decrease from the charging rate Q1. The charging curve L2, on the other hand, indicates that the negative-electrode potential starts to decrease after the charging rate Q2 (for example, 100[%] indicating full-charge). At the charging rate Q2, the negative-electrode potentials of the charging curves L1 and L2 are voltages V1 and V2, respectively. A potential difference (V2–V1) arises between the first charging time and the n-th charging time. This potential difference is referred to as the potential change quantity $\Delta V$.

Referring to FIG. 2 again, the negative-electrode potential evaluation part 21c evaluates the potential change quantity ΔV of the negative electrode 22m. According to the present embodiment, the negative-electrode potential evaluation part 21c uses for its evaluation operation one or more of the difference value evaluation method, the shift quantity evaluation method and a differentiation coefficient evaluation method. Each of the evaluation methods will be described in detail later (FIG. 4, FIG. 6 to FIG. 8).

The voltage setting part 21a is configured to set a set voltage Vset, which is lowered from the target voltage Vtar, as follows based on the potential change quantity ΔV of the negative electrode 22m evaluated by the negative-electrode potential evaluation part 21c.

$$Vset = Vtar - \Delta V$$

The set voltage Vset is preferably recorded in the recording part 21d. The discharging part 21b therefore charges the lithium-ion battery 22 by setting the set voltage Vset as the target voltage Vtar in the second and subsequent charging.

Figure 4:
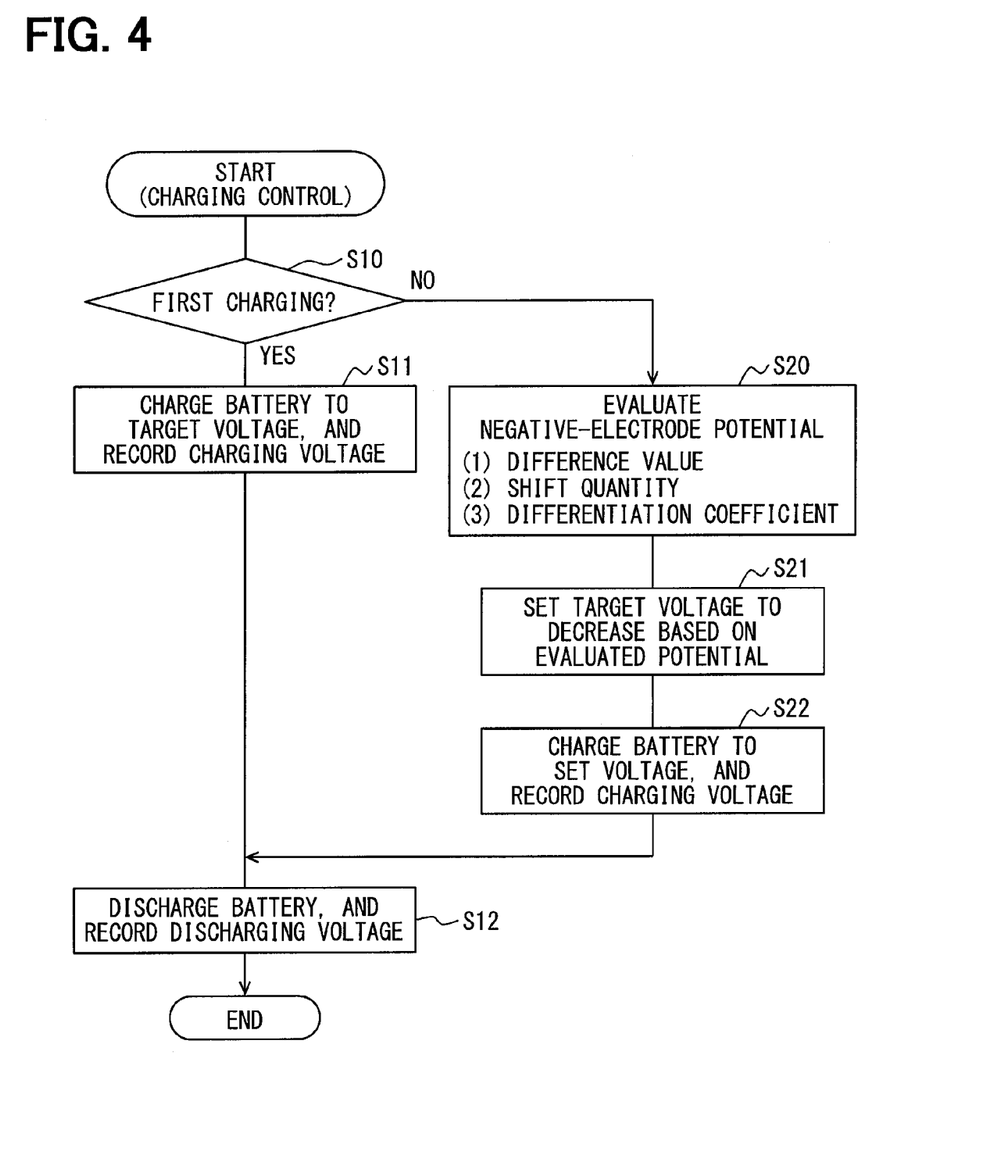
FIG. 4 is a flowchart showing exemplary charging control processing.

The exemplary control of charging and discharging the lithium-ion battery 22 will be described with reference to FIG. 4 to FIG. 8. In FIG. 4, steps S11 and S22 correspond to charging processing and the charging part 21b, step S20 corresponds to negative-electrode potential evaluation processing and the negative-electrode potential evaluation part 21c, and step S21 corresponds to voltage setting processing and the voltage setting part 21a. Similarly to FIG. 3, the axis of ordinate indicates the negative-electrode potential [V] and the axis of abscissa indicates the charging rate [%] in FIG. 5 to FIG. 8.

Charging control processing shown in FIG. 4 is executed repetitively by the charging control apparatus 21. It is checked first whether the charging of the lithium-ion battery 22 is the first charging (step S10). Since the voltage of the lithium-ion battery 22 is lower before charging (first charging) than after charging (second and subsequent charging), it may be checked by using a threshold voltage (for example, 0.3 M), which is between the voltage before charging and the voltage after charging.

When the charging of the lithium-ion battery 22 is the first time (YES at step S10), the switches SW are turned off to charge the lithium-ion battery 22 with the power supplied from the power source 10 (step S11). At the time of charging, the charging voltage Vchg, which varies from time to time, is recorded in the recording part 21d.

Figure 5:
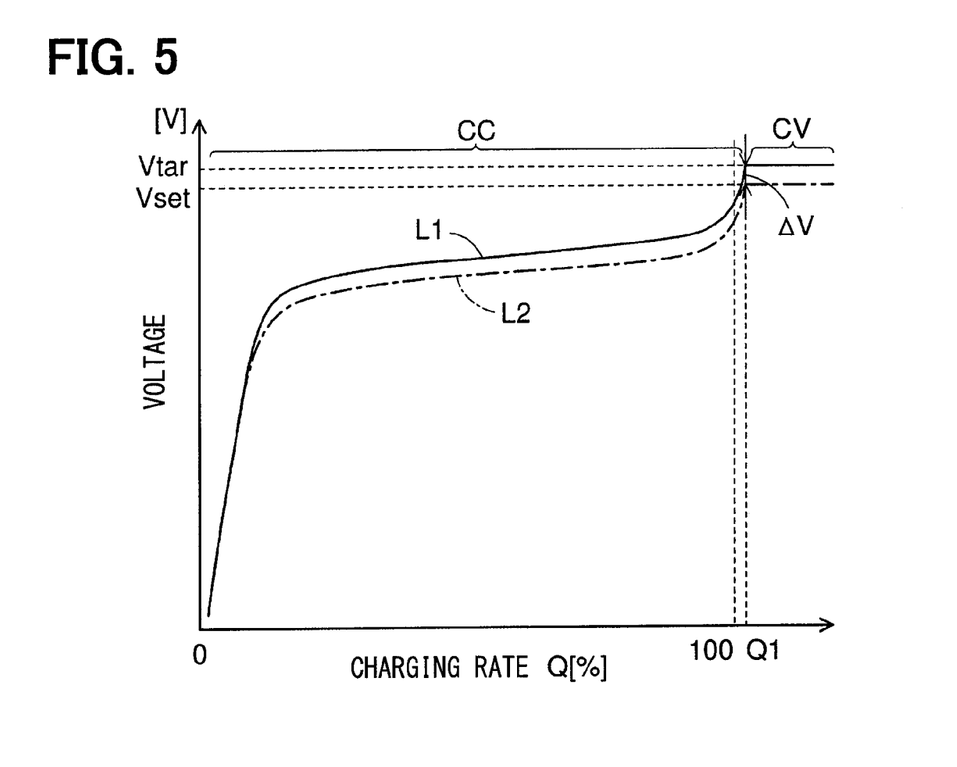
FIG. 5 is a graph showing exemplary changes of a charging curve and a discharging curve.

At the first charging, the charging voltage changes as indicated by the charging curve L1 shown with the solid line in FIG. 5, for example, when illustrated in the graph based on the charging voltage Vchg recorded in the recording part 21d. The first charging is performed by constant-current charging control CC until the charging rate Q1 (>100[%]), where the target voltage Vtar is attained, and by constant-voltage charging control after the charging rate Q1. Under the constant-current charging control, the charging is performed with the constant current and the variable voltage. Under the constant-voltage charging control, the charging is performed with the constant voltage and the variable current.

Referring back to FIG. 4, after completion of the first charging, the switches SW are turned on to discharge the lithium-ion battery 22 to supply power to the load 30 (step S12). The charging control processing of the first time is thus finished (returned). At the time of discharging, the discharging voltage Vdis, which varies from time to time is recorded in the recording part 21d. The discharging voltage Vdis changes as indicated by the discharging curve Ldis shown in FIG. 6, for example, when illustrated in the graph based on the discharging voltage Vdis recorded in the recording part 21d.

When the charging of the lithium-ion battery 22 is the second or subsequent time (NO at step S10), the negative potential (potential at the negative electrode 22m) is evaluated (step S20). The negative-electrode potential may be evaluated by various methods such as a difference value evaluation method, a shift quantity evaluation method and a differentiation coefficient evaluation method. Those methods will be described next with reference to FIG. 6 to FIG. 8. "Charging curve" is a characteristic determined based on the charging voltages Vchg recorded in the recording part 21d. "Discharging curve" is a characteristic determined based on the discharging voltages Vdis recorded in the recording part 21d.

(Difference Value Evaluation Method)

Figure 6:
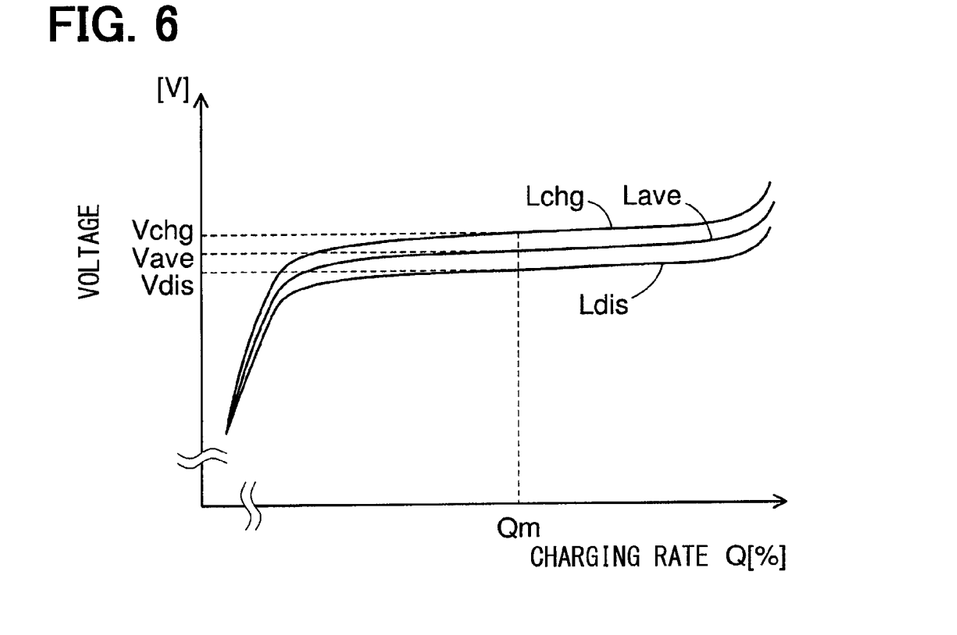
FIG. 6 is a graph chart showing a first exemplary evaluation of a negative-electrode potential.

The difference value, evaluation method evaluates a potential change quantity ΔV based on a difference between the charging voltage Vchg and the discharging voltage Vdis. As shown in FIG. 6, the charging voltage Vchg of the lithium-ion battery 22 at the time of charging varies as indicated with a charging curve Lchg and the discharging voltage Vdis of the lithium-ion battery 22 at the time of discharging varies as indicated with a discharging curve Ldis. According to the difference value evaluation method, an average value curve Lave, which is an average of the charging curve Lchg and the discharging curve Ldis, is used as a reference, and the potential of the negative electrode 22m is estimated to become higher by a quantity of difference between the charging curve Lchg and the average value curve Lave. At the same charging rate Qm, a voltage of the charging curve Lchg is assumed to be the charging voltage Vchg and a voltage of the average value curve Lave is assumed to be the average voltage Vave. Under this condition, the potential change quantity ΔV is calculated by the following equation.

$$\Delta V = Vchg - Vave$$

At the charging rate Qm, a voltage of the discharging curve Ldis is assumed to be the discharging voltage Vdis. The potential change quantity ΔV in this case may be calculated by either one of the following equations.

$$\Delta V = Vave - Vdis \text{ or } \Delta V = (Vchg - Vdis)/2$$

The above-described calculations are not limited to a simple average value but may be a weighted average in consideration of the number of charging.

(Shift Quantity Evaluation Method)

Figure 7:
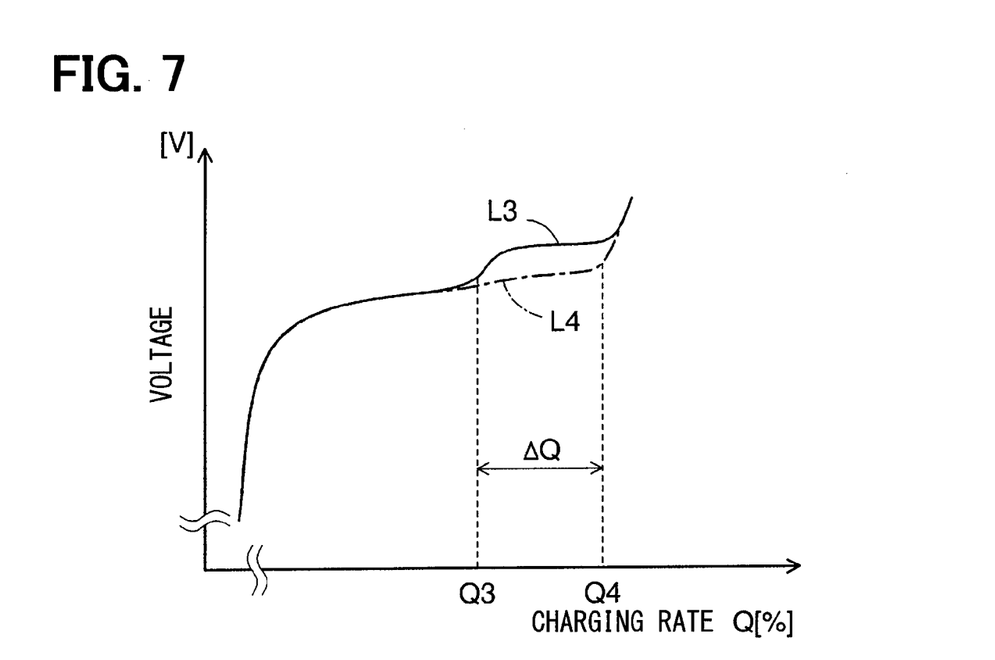
FIG. 7 is a graph showing a second exemplary evaluation of a negative-electrode potential.

The shift quantity evaluation method evaluates the potential change quantity ΔV based on the shift quantity. In FIG. 7, a charging curve L3 of the first time is indicated by a solid line and a charging curve L4 of the second and subsequent times is indicated by a one-dot chain line. The charging curves L3 and L4 correspond to characteristic curves. A point of the voltage of the lithium-ion battery 22, at which its change quantity exceeds a threshold value Vth (for example, 30 [mV], is defined as a stepwise change point. The stepwise change points of the charging curve L3 and the charging curve L4 in FIG. 7 are the charging rate Q3 and the charging rate L4, respectively. A difference between the charging rate Q4 and the charging rate Q3 is referred to as a shift quantity ΔQ.

The shift quantity ΔQ is a quantity of shift of the charging rate Q in increasing and decreasing directions. This shift quantity ΔQ corresponds to the negative-electrode potential in one-to-one relation and increases as the number of times of charging increases similarly to the potential change quantity ΔV. The relation between the shift quantity ΔQ and the potential change quantity ΔV is pre-recorded in the recording part 21d. The contents, which are recorded in the recording part 21d, are arbitrary as far as the potential change quantity ΔV can be determined (evaluated) based on the shift quantity ΔQ. The contents may be a data map, a data table, a mathematical function and the like. Thus the potential change quantity ΔV is evaluated based on the shift quantity ΔQ.

(Differentiation Coefficient Evaluation Method)

Figure 8:
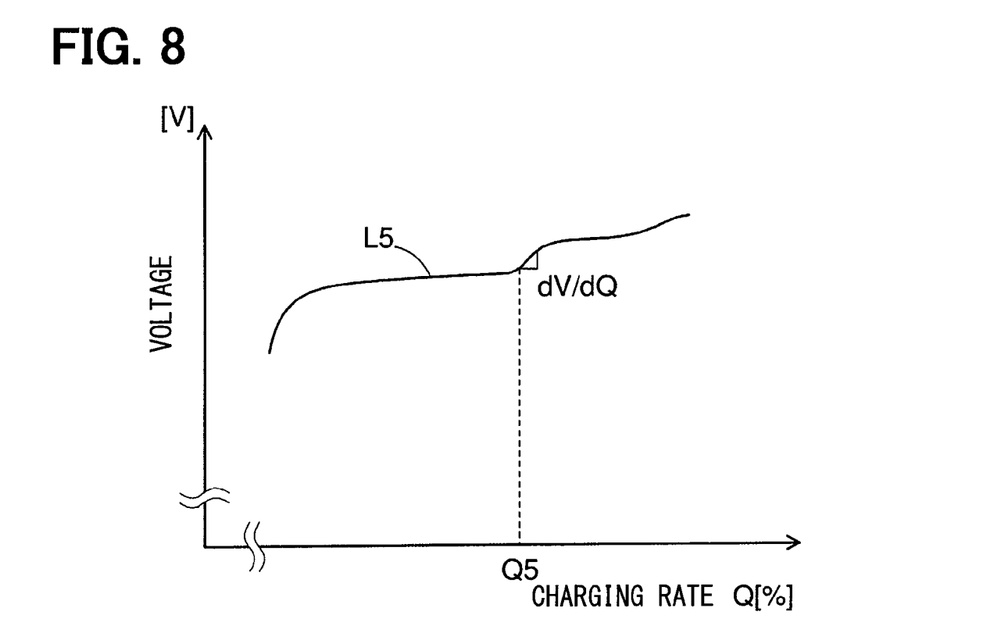
FIG. 8 is a graph showing a third exemplary evaluation of a negative-electrode potential.

The differentiation coefficient evaluation method evaluates the potential change quantity ΔV based on the differentiation coefficient. This evaluation method is one variation of the shift quantity evaluation method. The differentiation coefficient d is a coefficient, which is calculated by differentiating the charging voltage of the charging curve by the charging rate. The differentiation coefficient dV/dQ in the example shown in FIG. 8 is calculated by differentiating the charging voltage of the charging curve L5 by the charging rate Q5. The charging curve L5 corresponds to a characteristic curve. Specifically, dV/dQ is calculated when the charging voltage Vchg of the charging curve L5 changes by a voltage change quantity dV in response to a small change of the charging rate dQ from the charging rate Q5. When the differentiation coefficient dV/dQ calculated as described above exceeds a threshold value (for example, 5), the charging rate at that time (charging rate Q5 in FIG. 8) is referred to as the stepwise change point. The shift quantity ΔQ is calculated based on the stepwise change point determined as described above and the potential change quantity ΔV is evaluated based on the shift quantity ΔQ. This evaluation is the same as the shift quantity evaluation method. The shift quantity ΔQ can be calculated with higher accuracy than directly observing a step and hence the potential change quantity ΔV can be determined with higher accuracy.

Referring to FIG. 4 again, the set voltage Vset is set (step S21) by lowering the target voltage Vtar based on the potential change quantity ΔV (change quantity of the negative-electrode potential) evaluated at step S20. The set voltage Vset is set at step S21 as follows.

$$Vset = Vtar - \Delta V$$

For example, when the target voltage Vtar is 4.25 M and the potential change quantity ΔV is 0.02 [V], the set voltage Vset is 4.23 [V].

When the set voltage Vset is set, the lithium-ion battery 22 is charged to the set voltage Vset with the power supplied from the power source 10 (step S22). At step S22, the switches SW are turned off in the similar manner as step S11. In charging, the charging voltage Vchg, which varies from time to time, may be recorded in the recording part 21d as the case may be. Steps S21 and S22 may be executed in reversed order or at the same time in parallel.

After charging of the second and subsequent times, the switches SW are turned on to discharge the lithium-ion battery 22 to the load 30 (step S12) thereby completing (returning) the charging control processing of the first time. In discharging, the discharging voltage Vdis, which varies from time to time, may be recorded in the recording part 21d.

The charging voltage Vchg, which is recorded in the recording part 21d at the charging of the second time and subsequent times, is illustrated as a graph of FIG. 5, for example. The charging voltage Vchg changes as indicated by the charging curve 12 with the one-dot chain line. The charging of the second time and subsequent times is performed by the constant-current charging control CC until the charging rate Q1 (>100 [%]), which corresponds to the set voltage Vset, and by the constant-voltage charging control CV after the charging rate Q1.

With the charging control described above, the charging of the second time and the subsequent times is performed with the set voltage Vset lower than the target voltage Vtar even when the potential of the negative electrode 22m changes. As a result, at the final stage of charging, the potential of the positive electrode 22p is suppressed from rising, the deposition of lithium is suppressed to protect the positive electrode 22p from deterioration and decomposition gas of the electrolyte solution is suppressed from generating.

Other Embodiment

The charging control method and apparatus are described above with reference to one embodiment. The charging control method and apparatus however should not be limited to the disclosed embodiment. That is, the charging control method and apparatus may be implemented in different embodiments without departing from an essential point. For example, the charging control method and apparatus may be embodied as follows.

In the above-described embodiment, the lithium-ion battery system 20 is configured to be mounted in a vehicle (number of wheels is not limited). Alternatively, it may be configured to be mounted on any mobile bodies (for example, airplanes and ships) as other than vehicles or mobile terminals. Similarly, the charging control apparatus 21 may be mounted on such mobile bodies and mobile terminals. Since the difference is only subject of installation, the same function and operation are provided.

In the above-described embodiment, the charging curve L1 shown in FIG. 5 is assumed to be the first charging and the charging curve L2 is assumed to be the second and subsequent charging. Alternatively, the charging curve L2 may be assumed to be n-th charging and the charging curve L1 may be assumed to be (n−1)th charging, wherein "n" is an integer larger than 3. That is, assuming that the charging curve L2 is a reference, the charging voltage Vchg recorded at the time of charging of previous time may be used or an average value (for example, simple average, weighted average, moving average) calculated by using the charging voltage Vchg recorded plural times previously. By using optimum data recorded in the recording part 21d, the set voltage Vset can be set most appropriately for the n-th charging of the lithium-ion battery 22. Thus the deposition of the lithium, the deterioration of the positive electrode 22p itself and the generation of decomposition gas of the electrolyte solution can be suppressed.

In the above-described embodiment, the system is configured to have one power source 10 for supplying power for charging, one lithium-ion battery 22 for charging and discharging, and one load 30 for receiving power of discharging as shown in FIG. 1. Alternatively, the system may be configured to have plural power sources 10, plural lithium-ion batteries 22 and plural loads 30. Each device has no limitation (rating, capacity, type, connection and the like). Since the difference is only number of devices and component parts, the same function and operation are provided.

In the above-described embodiment, the negative-electrode potential (potential of the negative-electrode 22) is evaluated by either one of the difference evaluation method, the shift quantity evaluation method and the differentiation coefficient evaluation method as exemplified in FIG. 4 and FIG. 6 to FIG. 8. Alternatively, two or more evaluation methods among the difference value evaluation method, the shift quantity evaluation method and the differentiation coefficient evaluation method may be used. Further alternatively, other evaluation methods, for example, measurement by a voltage sensor connected to the negative terminal 223 and the reference terminal 222, may be used. In any alternatives, since the negative-electrode potential of the lithium-ion battery 22 is evaluated at each time, the same function and operation as those of the above-described embodiment can be provided.

In the above-described embodiment, the positive electrode 22p is formed by including the cathode active material of Olivine-type crystal structure. Alternatively or in addition, the positive electrode 22p may be formed by including a cathode active material other than Olivine-type crystal structure. The cathode active material other than the Olivine-type crystal structure may be, for example, a material of polyanion-type crystal structure. The cathode active material of polyanion-type crystal structure is expressed as a chemical formula, Li$\alpha$M$\beta$X$\eta$O4-$\gamma$Z$\gamma$ (0≤$\alpha$≤2.0, 0≤$\beta$≤1.5, 1≤$\eta$≤1.5, 0≤$\gamma$≤1.5). "M" is one or more materials selected from Mn, Co, Ni, Fe, Cu, Cr, Mg, Ca, Zn and Ti. "X" is one or more materials selected from P, As, Si, Mo and Ge. "Z" is one or more materials selected from Al, Mg. Ca, Zn and Ti. That is, it is only required that the lithium-ion battery 22 is configured to exhibit the charging characteristics shown in FIG. 5 to FIG. 8 by the cathode active material included in the positive electrode 22p. Since the negative-electrode potential of the lithium-ion battery 22 can be evaluated at each time, the same function and operation as those of the above-described embodiment can be provided.

(Advantage)

The embodiments described above provide the following advantages.

(1) The charging control method (FIG. 4 to FIG. 8) for the lithium-ion battery 22 is provided with the charging processing (steps S11, S22 in FIG. 4), the negative-electrode potential evaluation processing (step S20 in FIG. 4) and the voltage setting processing (step S21 in FIG. 4). The lithium-ion battery 22 includes the cathode active material having the Olivine-type crystal structure. The charging processing charges the battery to the target voltage Vtar by the constant-current and constant-voltage charging method. The negative-electrode potential evaluation processing evaluates the potential change quantity $\Delta V$ of the negative electrode 22m. The voltage setting processing decreases the target voltage Vtar based on the potential change quantity $\Delta V$ of the negative-electrode 22m evaluated in the negative-electrode potential evaluation processing. In this method, the charging processing is configured to charge the battery to the target voltage Vtar (step S11 in FIG. 4) before the negative-electrode potential evaluation processing evaluates the negative-electrode potential, and then charge the battery to the voltage (set voltage Vset) set by the voltage setting processing (step S22 in FIG. 4) after the negative-electrode potential is evaluated by the negative-electrode potential evaluation processing. Even when the negative-electrode potential changes in accordance with an increase in the number of charging and aging deterioration, the voltage is lowered from the target voltage Vtar to the set voltage Vset. The charging is made less susceptible to the increase in the number of charging and the aging deterioration and hence the positive-electrode potential is restricted from rising. As a result, the positive-electrode 22p itself is protected from deterioration.

(2) The negative-electrode potential evaluation processing (step S20 in FIG. 4) is configured to evaluate the potential change quantity $\Delta V$ of the negative-electrode 22m (FIG. 4 and FIG. 6 to FIG. 8) based on one of or both of the charging voltage Vchg, which is measured as the voltage charged to the lithium-ion battery 22, and the discharging voltage Vdis, which is measured as the voltage discharged from the lithium-ion battery 22. According to this configuration, the potential change quantity $\Delta V$ of the negative electrode 22m can be evaluated with reference to the charging voltage Vchg and the discharging voltage Vdis recorded in the recording part 21d. Thus it is possible to restrict the positive-electrode potential from rising and the positive electrode 22p itself from deteriorating.

(3) The negative-electrode potential evaluation processing (step S20 in FIG. 4) is configured to evaluate the potential change quantity $\Delta V$ of the negative electrode 22m (FIG. 4 and FIG. 6) based on the difference between the charging voltage Vchg and the discharging voltage Vdis under the same charging rate Qm. That is, it is determined by either one of the following equations.

$$\Delta V = Vchg - Vave, \Delta V = Vave - Vdis, \Delta V = (Vchg - Vdis)/2$$

According to this configuration, the potential change quantity $\Delta V$ of the negative electrode 22m can be evaluated based on the charging voltage Vchg and the discharging voltage Vdis, which can be measured easily with the voltage sensor. It is thus possible to restrict the positive-electrode potential from rising and the positive electrode 22p itself from deteriorating.

(4) The negative-electrode potential evaluation processing (step S20 in FIG. 4) is configured to specify the stepwise change point (charging rate Q5), at which the quantity of change in the charging voltage Vchg relative to the charging rate Q changes in excess of the threshold value Vth, and evaluates the potential change quantity $\Delta V$ of the negative electrode 22m based on the shift quantity $\Delta Q$ of the stepwise change point in the increasing and decreasing directions. The potential change quantity $\Delta V$ of the negative electrode 22m may be evaluated by determining the shift quantity $\Delta Q$ by using the charging voltage Vdis, in place of or in addition to the charging voltage Vchg. According to this configuration, the potential change quantity $\Delta V$ of the negative electrode 22m can be evaluated based on the shift quantity $\Delta Q$, which corresponds to the potential of the negative electrode 22m (negative-electrode potential) in one-to-one relation. It is thus possible to restrict the positive-electrode potential from rising and the positive electrode 22p itself from deteriorating.

(5) The negative-electrode potential evaluation processing (step S20 in FIG. 4) is configured to specify the stepwise change point (charging rate Q5 in FIG. 8) with respect to the charging curve (characteristic curve) L5 of the charging voltage Vchg based on the differentiation coefficient dV/dQ, which is calculated by differentiating the voltage by the charging rate Q (FIG. 4 and FIG. 8). In place of or in addition to the charging curve L5 of the charging voltage Vchg, the stepwise change point may be specified based on the differentiation coefficient dV/dQ, which is calculated by differentiating the voltage V by the charging rate Q with respect to the discharging curve of the discharging voltage Vdis. The discharging curve is the characteristic curve, to which the discharging curve Ldis shown in FIG. 6 corresponds for example. According to this configuration, the shift quantity $\Delta Q$ can be determined with higher accuracy than directly observing the steps in the charging curves L3 and L4 and hence the potential change quantity ΔV can be determined with high accuracy.

(6) The charging control apparatus 21 (FIG. 2) for the lithium-ion battery 22 is provided with the charging part 21b, the negative-electrode potential evaluation part 21c and the voltage setting part 21a. The lithium-ion battery 22 includes the cathode active material having the Olivine-type crystal structure. The charging part 21b charges the lithium-ion battery 22 to the target voltage Vtar by the constant-current and constant-voltage charging method. The negative-electrode potential evaluation part 21c evaluates the potential change quantity ΔV of the negative electrode 22m. The voltage setting part 21a sets the target voltage Vtar to decrease based on the potential change quantity ΔV of the negative-electrode 22m evaluated by the negative-electrode potential evaluation part 21c. In this apparatus 21, the charging part 21b charges the lithium-ion battery 22 to the target voltage Vtar before the negative-electrode potential evaluation part 21c evaluates the negative-electrode potential (potential of the negative electrode 22m), and then charges the lithium-ion battery 22 to the voltage (set voltage Vset) set by the voltage setting part 21a after the negative-electrode potential is evaluated by the negative-electrode potential evaluation part 21c. Even when the negative-electrode potential changes in accordance with an increase in the number of charging and aging deterioration, the voltage is lowered based on the evaluated negative-electrode potential. The charging is made less susceptible to the increase in the number of charging and the aging deterioration and hence the positive-electrode potential is restricted from rising. It is thus possible to restrict the positive electrode 22p itself from deteriorating.

(7) The negative-electrode potential evaluation part 21c is configured to evaluate the potential change quantity ΔV of the negative-electrode 22m (FIG. 2, FIG. 4 and FIG. 6 to FIG. 8) based on one of or both of the charging voltage Vchg, which is measured as the voltage charged to the lithium-ion battery 22, and the discharging voltage Vdis, which is measured as the voltage discharged from the lithium-ion battery 22. According to this configuration, the potential change quantity ΔV of the negative electrode 22m can be evaluated with reference to the charging voltage Vchg and the discharging voltage Vdis recorded in the recording part 21d. It is thus possible to restrict the positive-electrode potential from rising and the positive electrode 22p itself from deteriorating.

(8) The negative-electrode potential evaluation part 21c is configured to evaluate the potential change quantity ΔV of the negative electrode 22m (FIG. 4 and FIG. 6) based on the difference between the charging voltage Vchg and the discharging voltage Vdis under the same charging rate Qm. That is, it is determined by either one of the following equations.

$$\Delta V = V\text{chg} - V\text{ave}, \Delta V = V\text{ave} - V\text{dis}, \Delta V = (V\text{chg} - V\text{dis})/2$$

According to this configuration, the potential change quantity ΔV of the negative electrode 22m can be evaluated based on the charging voltage Vchg and the discharging voltage Vdis, which can be measured easily with the voltage sensor. It is thus possible to restrict the positive-electrode potential from rising and the positive electrode 22p itself from deteriorating.

(9) The negative-electrode potential evaluation part 21c is configured to specify the stepwise change point, at which the quantity of change in the charging voltage Vchg relative to the charging rate Q changes in excess of the threshold value Vth, and evaluate the potential change quantity ΔV of the negative electrode 22m based on the shift quantity ΔQ of the stepwise change point in the increasing and decreasing directions. The potential change quantity ΔV of the negative electrode 22m may be evaluated by determining the shift quantity. ΔQ by using the charging voltage Vdis, in place of or in addition to the charging voltage Vchg. According to this configuration, the potential change quantity ΔV of the negative electrode 22m can be evaluated based on the shift quantity ΔQ, which corresponds to the potential of the negative electrode 22m (negative-electrode potential) in one-to-one relation. It is thus possible to restrict the positive-electrode potential from rising and the positive electrode 22p itself from deteriorating.

(10) The negative-electrode potential evaluation part 21c is configured to specify the stepwise change point (charging rate Q5 in FIG. 8) with respect to the charging curve (characteristic curve) L5 of the charging voltage Vchg based on the differentiation coefficient dV/dQ, which is calculated by differentiating the voltage by the charging rate Q (FIG. 4 and FIG. 8). In place of or in addition to the charging curve L5 of the charging voltage Vchg, the stepwise change point may be specified based on the differentiation coefficient dV/dQ, which is calculated by differentiating the voltage V by the charging rate Q with respect to the discharging curve of the discharging voltage Vdis. According to this configuration, the shift quantity ΔQ can be determined with higher accuracy than directly observing the steps in the charging curves L3 and L4 and hence the potential change quantity ΔV can be determined with high accuracy.

(11) The lithium-ion battery system 20 is provided with the lithium-ion battery 22 and the charging control apparatus 21 for the lithium-ion battery 22 (FIG. 1). According to the lithium-ion battery system 20, it is possible to provide the lithium-ion battery system 20, which is capable of restricting the positive-electrode potential from rising and the positive electrode 22p itself from deteriorating.

What is claimed is:

1. A charging control method for controlling charging of a lithium-ion battery, which is provided with a positive electrode and a negative electrode, the charging control method comprising:

charging processing for charging the lithium-ion battery to a target voltage by a constant-current and constant-voltage charging method, the lithium-ion battery including a cathode active material having Olivine-type crystal structure;

negative-electrode potential evaluation processing for evaluating a potential change quantity of the negative electrode; and voltage setting processing for setting the target voltage to decrease based on the potential change quantity of the negative-electrode evaluated by the negative-electrode potential evaluation processing; wherein the negative-electrode potential evaluation processing evaluates the potential change quantity of the negative-electrode based on one of or both of a charging voltage, which is measured as a voltage charged to the lithium-ion battery, and a discharging voltage, which is measured as a voltage discharged from the lithium-ion battery; and the negative-electrode potential evaluation processing specifies a stepwise change point, at which a quantity of change in one of or both of the charging voltage and the discharging voltage relative to the charging rate changes in excess of a threshold value, and evaluates the potential change quantity of the negative electrode based on a shift quantity of the stepwise change point in increasing and decreasing directions.

2. The charging control method for controlling charging of a lithium-ion battery according to claim 1, wherein:
the negative-electrode potential evaluation processing evaluates the potential change quantity of the negative electrode based on a difference value between the charging voltage and the discharging voltage, which are at a same charging rate.

3. The charging control method for controlling charging of a lithium-ion battery according to claim 1, wherein:
the negative-electrode potential evaluation processing specifies the stepwise change point, with respect to a characteristic curve of one of or both of the charging voltage and the discharging voltage, based on a differentiation coefficient, which is calculated by differentiating the voltage by the charging rate.

4. A charging control apparatus for controlling charging of a lithium-ion battery, which is provided with a positive electrode and a negative electrode, the charging control apparatus comprising:
a charging part for charging the lithium-ion battery to a target voltage by a constant-current and constant-voltage charging method, the lithium-ion battery including a cathode active material having Olivine-type crystal structure;
a negative-electrode potential evaluation part for evaluating a potential change quantity of the negative electrode; and
voltage setting part for setting the target voltage to decrease based on the potential change quantity of the negative-electrode evaluated by the negative-electrode potential evaluation part; wherein
the negative-electrode potential evaluation part evaluates the potential change quantity of the negative-electrode based on one of or both of a charging voltage, which is measured as a voltage charged to the lithium-ion battery, and a discharging voltage, which is measured as a voltage discharged from the lithium-ion battery; and
the negative-electrode potential evaluation part specifies a stepwise change point, at which a quantity of change in one of or both of the charging voltage and the discharging voltage relative to the charging rate changes in excess of a threshold value, and evaluates the potential change quantity of the negative electrode based on a shift quantity of the stepwise change point in increasing and decreasing directions.

5. The charging control method for controlling charging of a lithium-ion battery according to claim 4, wherein:
the negative-electrode potential evaluation part evaluates the potential change quantity of the negative electrode based on a difference value between the charging voltage and the discharging voltage, which are at a same charging rate.

6. The charging control method for controlling charging of a lithium-ion battery according to claim 4, wherein:
the negative-electrode potential evaluation part specifies the stepwise change point, with respect to a characteristic curve of one of or both of the charging voltage and the discharging voltage, based on a differentiation coefficient, which is calculated by differentiating the voltage by the charging rate.

7. A lithium-ion battery system comprising:
the charging control apparatus according to claim 4; and
the lithium battery.

* * * * *